US008117164B2

(12) United States Patent
Spektor et al.

(10) Patent No.: US 8,117,164 B2
(45) Date of Patent: Feb. 14, 2012

(54) CREATING AND UTILIZING NETWORK RESTORE POINTS (75) Inventors: Daron Spektor, Seattle, WA (US); David Mercer, Bothell, WA (US); William D. Hay, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 11/959,465

(22) Filed: Dec. 19, 2007

(65) Prior Publication Data
US 2009/0164527 A1    Jun. 25, 2009

(51) Int. Cl.
G06F 7/00        (2006.01)
(52) U.S. Cl. .................................................. 707/640
(58) Field of Classification Search .................. 707/640
See application file for complete search history.

(56) References Cited

U.S. PATENT DOCUMENTS

| 6,212,531 | B1 * | 4/2001 | Blea et al. ...................... 707/204 |
| 6,311,187 | B1 | 10/2001 | Jeyaraman |
| 6,877,016 | B1 * | 4/2005 | Hart et al. ...................... 707/201 |
| 6,948,089 | B2 | 9/2005 | Fujibayashi |
| 7,236,982 | B2 | 6/2007 | Zlatanov et al. |
| 7,251,713 | B1 | 7/2007 | Zhang |
| 7,634,507 | B2 * | 12/2009 | Atluri et al. .................... 707/200 |
| 2002/0087588 | A1 * | 7/2002 | McBride et al. .............. 707/204 |
| 2003/0093444 | A1 | 5/2003 | Huxoll |
| 2003/0131073 | A1 | 7/2003 | Lucovsky et al. |
| 2003/0182301 | A1 | 9/2003 | Patterson et al. |
| 2003/0220929 | A1 | 11/2003 | Tolpin et al. |
| 2003/0220948 | A1 * | 11/2003 | Green et al. ................... 707/204 |
| 2004/0117572 | A1 | 6/2004 | Welsh et al. |
| 2005/0010733 | A1 * | 1/2005 | Mimatsu et al. .............. 711/162 |
| 2005/0188256 | A1 | 8/2005 | Stager et al. |
| 2005/0210414 | A1 | 9/2005 | Angiulo et al. |
| 2006/0041727 | A1 | 2/2006 | Adkins et al. |
| 2006/0085613 | A1 * | 4/2006 | Mimatsu et al. .............. 711/162 |
| 2006/0168295 | A1 | 7/2006 | Batterberry et al. |
| 2007/0005915 | A1 | 1/2007 | Thompson et al. |
| 2007/0055833 | A1 | 3/2007 | Vu et al. |
| 2007/0174569 | A1 | 7/2007 | Schnapp et al. |
| 2007/0180307 | A1 * | 8/2007 | Zohar et al. ....................... 714/6 |
| 2007/0185937 | A1 | 8/2007 | Prahlad et al. |
| 2007/0204120 | A1 | 8/2007 | Garimella et al. |

(Continued)

OTHER PUBLICATIONS

"Data Protection Strategies for Network Appliance Storage Systems", Date: 2004, pp. 1-12.

(Continued)

Primary Examiner — Kimberly Lovel
Assistant Examiner — Mohammed R Uddin
(74) Attorney, Agent, or Firm — Meyer & Williams P.C.

(57) ABSTRACT

The creation and utilization of network restore points is provided by a schema associated with a structured data set that can be conveniently backed up by periodically taking snapshots of the structured data to establish a series of restore points that can be used in the event that the primary structured data becomes lost or corrupted. In general, the snapshots are only taken after the structured data set has undergone a change in content, although they may be taken at other times as well. The snapshot may be taken by a network restore point engine that can be accessed by a user over the Internet. In addition, the snapshot may be stored on an Internet-based storage medium or it may be pushed to or pulled by the client so that the snapshot resides on a client-resident storage medium.

18 Claims, 7 Drawing Sheets

U.S. PATENT DOCUMENTS

| | | |
|---|---|---|
| 2007/0208783 A1 | 9/2007 | Midgley et al. |
| 2007/0250663 A1* | 10/2007 | Welsh et al. .................. 711/117 |
| 2007/0255934 A1 | 11/2007 | Dennis |
| 2007/0255977 A1 | 11/2007 | Liccione et al. |
| 2008/0082593 A1* | 4/2008 | Komarov et al. ............. 707/204 |
| 2008/0307179 A1* | 12/2008 | Boyd et al. .................... 711/162 |
| 2008/0313236 A1* | 12/2008 | Vijayakumar et al. ........ 707/200 |
| 2009/0125570 A1* | 5/2009 | Bailey et al. .................. 707/204 |

OTHER PUBLICATIONS

"Data Protection and Disaster Recovery", Date: Aug. 2006, pp. 1-28.

"The Online Back up Advantage", Date: 2006, pp. 1-15.

* cited by examiner

AUTHOR: TED Z — 524-1

POSTED ON MON DEC 10 09:05:00 2007 — 522-1

BLOG TITLE: MADRID, SPAIN (AP) TWO-TIME FORMULA ONE WORLD CHAMPION FERNANDO ALONSO IS HEADING BACK TO RENAULT.

THE 26-YEAR-OLD SPANIARD ANNOUNCED HIS RETURN TO THE FRENCH TEAM MONDAY AFTER A TURBULENT SEASON AT MCLAREN. AT RENAULT IN 2005, ALONSO BECAME THE YOUNGEST DRIVER IN F1 HISTORY TO WIN THE TITLE. HE REPEATED IN 2006. "I AM DELIGHTED TO BE RETURNING TO RENAULT," ALONSO SAID IN A STATEMENT. "THIS IS THE TEAM WHERE I GREW UP AS A DRIVER IN FORMULA ONE. NOW IT IS TIME FOR US TO BEGIN A NEW CHAPTER TOGETHER." RENAULT SAID THAT ALONSO, WHO AGREED TO A TWO-YEAR CONTRACT, WOULD DRIVE ALONG WITH NELSON PIQUET JR. THE DUO WILL MAKE THEIR DEBUT TESTING THE NEW R28 CAR AT VALENCIA FROM JAN. 22-24.

AUTHOR: TED Z — 524-2

POSTED ON SUN MAR 16 02:15:17 2003 — 522-2

TONY AND LUCY: TODAY I WENT TO THE STORE AND RAN INTO MY BUDDY TONY AND HIS GIRLFRIEND LUCY. THEY WERE SHOPPING FOR WATER BALLOONS.

CREATING AND UTILIZING NETWORK RESTORE POINTS

BACKGROUND

As the Internet has matured, the nature and characteristics of the content available over the Internet has changed. In particular, the content stored by users over the Internet has increased in complexity. In addition to simply storing data such as text, images, video, audio, and the like, it has become more and more common to store structured data over the Internet. Structured data refers to data that has been organized in accordance with a schema. As used herein, a "schema" generally comprises a set of rules that define how data is to be organized. The schema provides structure and context to the underlying data. Schemas vary depending on the type of data they are intended to organize, e.g., an email-inbox-related schema organizes data differently from a schema that organizes a user's favorite websites, which organizes data differently from a schema that organizes a photo album.

The loss of a user's structured data can have an impact not only on that individual user but also on other users and other applications that rely on the data. Accordingly, it is increasingly important to back up such data in the event it becomes lost, inadvertently deleted, or corrupted.

Today many backup systems operate by backing up data files stored on a computer network, file by file, to a long term storage medium, such as a tape backup system. The traditional process of backing up data to tape media is time driven and time dependent. That is, a backup process typically is run at regular intervals and covers a certain period of time. For example, a full system backup may be run once a week on a weekend, and incremental backups may be run every weekday during an overnight backup window that starts after the close of business and ends before the next business day.

These individual backups are then saved for a predetermined period of time, according to a retention policy. In order to conserve tape media and storage space, older backups are gradually faded out and replaced by newer backups. Further to the above example, after a full weekly backup is completed, the daily incremental backups for the preceding week may be discarded, and each weekly backup may be maintained for a few months, to be replaced by monthly backups. The daily backups are typically not all discarded on the same day. Instead, the Monday backup set is overwritten on Monday, the Tuesday backup set is overwritten on Tuesday, and so on. This ensures that a backup set is available that is within eight business hours of any corruption that may have occurred in the past week.

Despite frequent hardware failures and the need for ongoing maintenance and tuning, the backup creation process can be automated, while restoring data from a backup remains a manual and time-critical process. First, the appropriate backup tapes need to be located, including the latest full backup and any incremental backups made since the last full backup. In the event that only a partial restoration is required, locating the appropriate backup tape can take just as long.

In general, structured data is stored in relational databases and backups are created for the databases in their entirety rather than for each user's subset of structured data individually. As a result, if only a single user's structured data needs to be restored from the backup, the backup tapes for the entire database need to be located and restored onto a secondary staging system. From that system, the requisite structured data needs to be manually extracted and written to the primary store. Thus, if a portion of the data is lost, it is often difficult to restore just the data that was lost, and often the system administrator is forced to decide whether it is worth the cost of retrieving the lost portion of the data.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

The creation and utilization of network restore points is provided by a schema associated with a structured data set that can be conveniently backed up by periodically taking snapshots of the structured data to establish a series of restore points that can be used in the event that the primary structured data becomes lost or corrupted. In general, the snapshots are only taken after the structured data set has undergone a change in content, although they may be taken at other times as well. The snapshot may be taken by a network restore point engine that can be accessed by a user over the Internet. In addition, the snapshot may be stored on an Internet-based storage medium or it may be pushed to or pulled by the client so that the snapshot resides on a client-resident storage medium.

In various illustrative examples, snapshots of the structured data set are only taken when the aggregation of changes made to the structured data since the previous snapshot exceeds a threshold. Various retention policies for the restore points may also be specified. Alternatively, different retention policies may be applicable to users with different restoration service subscription levels (e.g., basic, premium, etc.).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Schemas are used to organize many different types of data for many different purposes. One straightforward example of data that may be schematized involves image files. For example, users often organize digital photographs (e.g., Joint Photographic Experts Group, or "JPEG" image files) into a digital photo album using a client-based or Internet based photo album application. An example of a schema for organizing digital photographs (i.e., the underlying data) is shown in FIG. 1.

Figure 1:
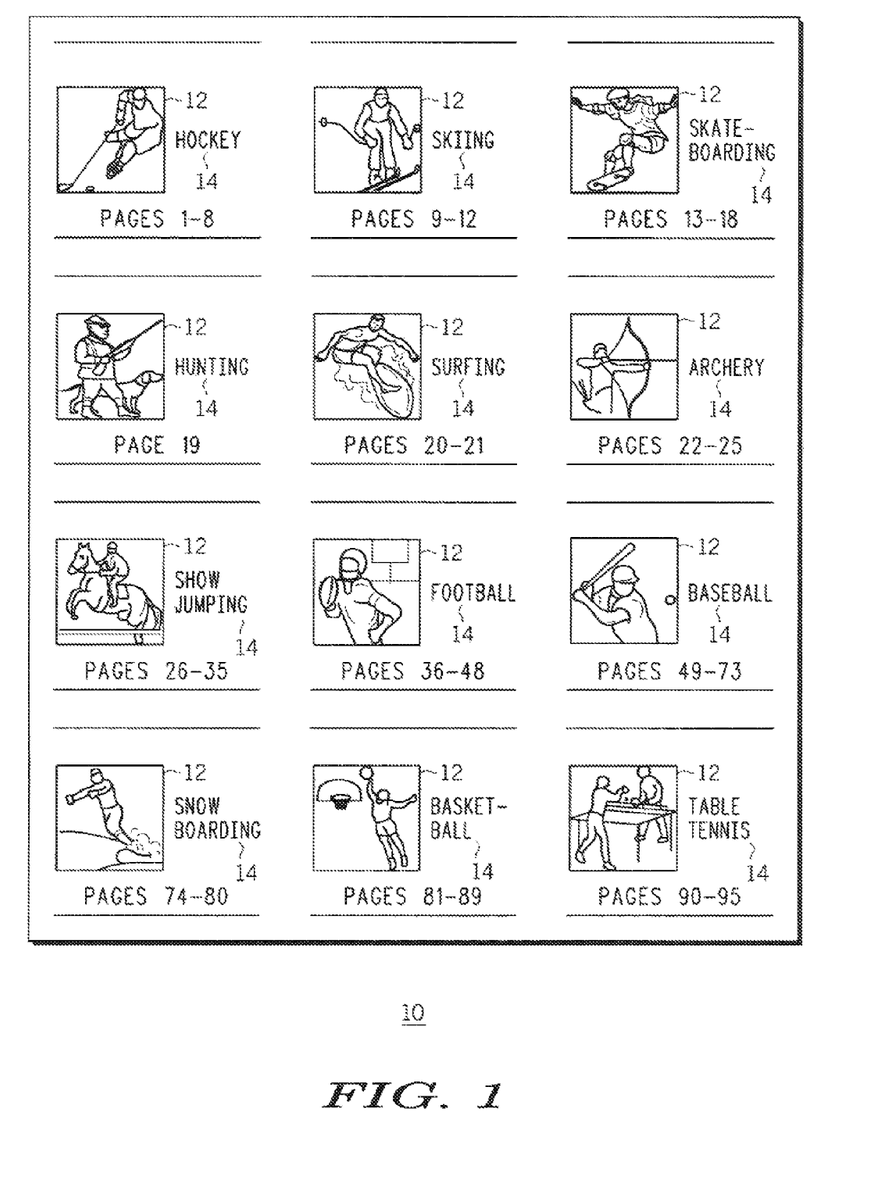
FIG. 1 shows an illustrative structured data set that defines a digital photo album.

FIG. 1 shows the first page of a particular photo album 10 that serves as a table of contents. In this example the photographs represent athletic events. Photographs of different athletic events are grouped together as chapters that are presented on different pages of the album. For instance, hockey photographs are presented on pages 1-8, skiing photographs are presented on pages 9-12, and so on. Each chapter is denoted by a thumbnail image 12 of a representative photograph from that chapter and label 14 identifying the athletic event. The schema in this example is the particular hierarchical organization of the photographs into chapters. The underlying data includes the thumbnail images 12 and the various labels 14 that provide context to the schema.

Another example of a client-based or Internet based application that organizes data in accordance with a schema is a blog application. A "blog" (short for "web log") refers to an Internet-based diary that generally contains time-stamped entries that are entered by users who have read/write privileges to the blog.

Figure 2:
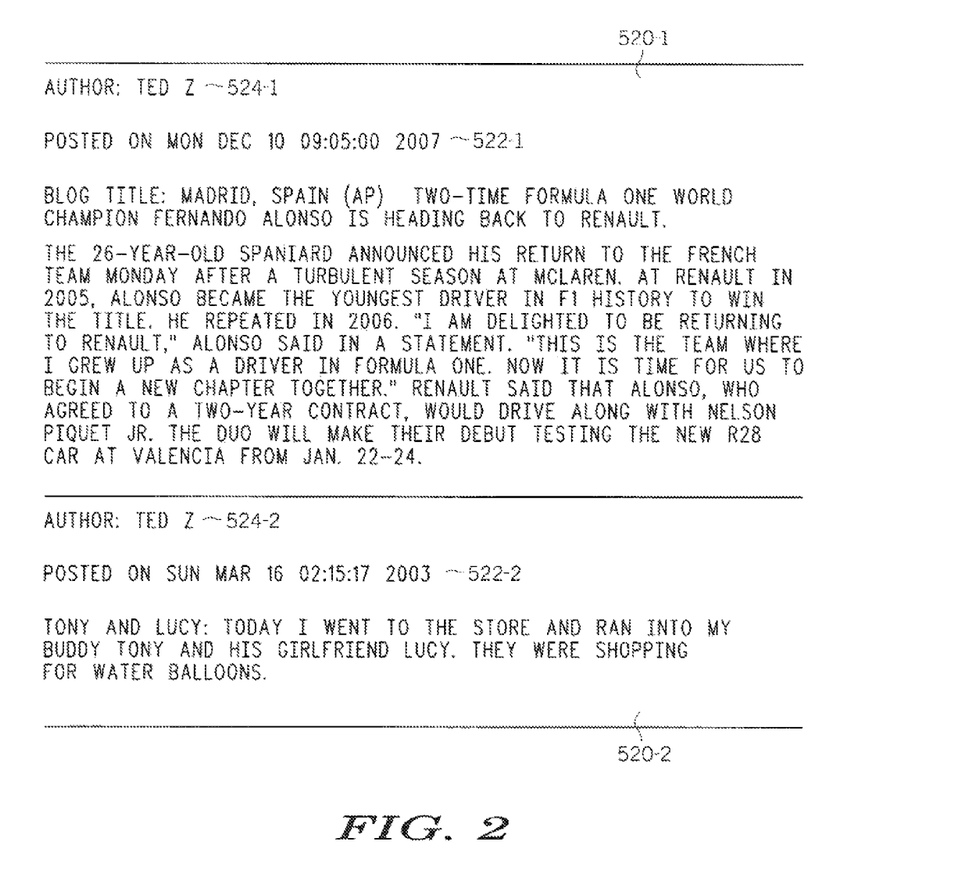
FIG. 2 shows an illustrative structured data set that defines a blog (i.e., a web log)

FIG. 2 illustrates a portion of a blog with two time stamped entries 520-1 and 520-2. Each blog entry 520 is stamped with the date 522 on which it was created. Further, the author 524 of each blog entry 520 is noted in the entry. Although not shown, each blog optionally has a blog title and one or more different categories. Similar to the photo album, the schema of the blog is largely independent of the underlying data that is being organized.

Figure 3:
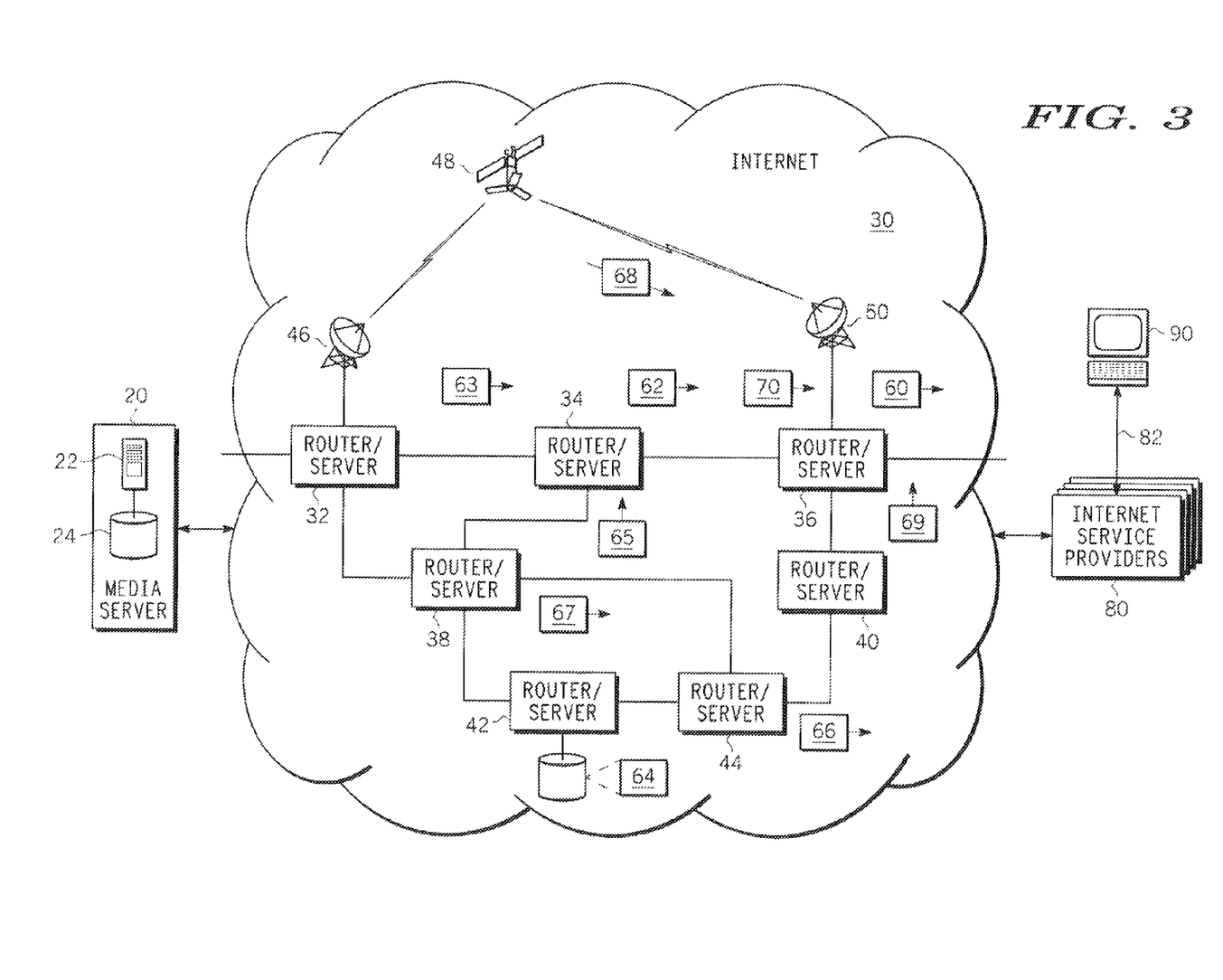
FIG. 3 shows an illustrative client-server environment that may be used to support the creation and utilization of network restore points.

FIG. 3 illustrates an example of an environment in which a client 90 and server 20 communicate over the Internet or any other packet-based network. It includes a server, which is coupled to the Internet 30. The server typically includes one or more physical server computers 22 with one or more physical storage devices and/or databases 24. Here, a server is a network entity that executes one or more applications that provide a service to a client.

The client 90 is connected, on line 82 in FIG. 3, to the Internet via one of many available Internet Service Providers ("ISPs") 80. Cloud 30 is labeled the Internet, but it is understood that this cloud represents that portion of the Internet 30 that does not include the server, the client's ISP, and the client. However, it should be noted that from the client's perspective the server 20 or other device or service with which the client communicates is often viewed as being inside the cloud.

Inside such a cloud are the routers, transmission lines, connections, and other devices that transmit data between clients and servers. For example, inside illustrative Internet cloud 30 are routers 32, 34, 36, 38, 40, 42, 44; two satellite dishes 46 and 50; and a satellite 48. These represent possible nodes that data packets may traverse between the server and the client. Illustrative data packets 60, 62, 63, 64, 65, 66, 67, 68, 69 and 70 are shown traversing the various nodes.

The client 90 creates, defines, or otherwise generates structured data sets using a client-based or Internet-based application or an application that is in part client-based and in part Internet-based. That is, the functionality of the application could be provided as part of a service or as a client-resident program. As discussed above, two illustrative examples of such applications include a photo album application and a blogging application. In addition, many other software applications may be used to organize data, including, for example, financial software, desktop publishing software, database software, animation software, computer aided design ("CAD") software and the like.

The structured data sets may reside on the client 90 and/or on the storage device 24 associated with server 22. In the case of a blog, for instance, the structured data sets will generally reside on the storage device 24 so that they can be accessed by other clients.

As discussed above, conventional techniques for backing up and restoring structured data sets that reside in the Internet cloud 30 can be arduous to implement. This problem can be overcome by providing an arrangement that takes a snapshot of the data in a structured data set, which can be stored and used as a restore point.

A snapshot is a point-in-time representation of an individual user's data located on a storage medium. The data is essentially frozen in time at the instant that the snapshot is taken. Although data on the storage medium may change as a result of write operations, the data within the snapshot will remain constant and frozen in time at the instant that the snapshot was taken. Of course, the snapshot will take a finite amount of time to be acquired, during which the data may or may not change. The data can be prevented from being changed while the backup is being performed using a suitable mechanism.

In general, a snapshot will only be taken of structured data that is eligible for backup. For instance, a snapshot may only be taken of structured data that has undergone a change since the previously acquired snapshot. Accordingly, an initial set of snapshots taken against a storage system may represent all of the data sets present on the system. Any subsequent snapshots will only extract structured data sets that have been changed. In this way, the total size of all snapshots taken in any time range is generally far less than the size of the equivalent conventional backups, as conventional backups include all of the data sets rather than just the changed ones.

In order to preserve snapshot data, a repository or backup storage medium is used to store the snapshot. The resulting snapshot is an image of the underlying data, and possibly the schema, as they were just before the start of the snapshot (i.e., a consistent point-in-time image). In the case of a snapshot of both the schema and the underlying data, the snapshot image may provide a full point-in-time restore point just as if the recovery process were using a traditional offline backup.

The snapshot may be extracted from the structured data set in any appropriate manner that may in part depend on the nature of the schema and the underlying data. For example, in many cases the snapshot may be an XML (eXtensible Markup Language) representation of the structured data set. In some cases the snapshot may be compressed before it is stored on the backup repository. However, in other cases it may be advantageous to leave the snapshot uncompressed because if the information in a compressed file becomes corrupted, the file is often quite difficult to decompress. In addition, the snapshot may also be protected from tampering by using a hash or a digital signature.

The snapshot may be stored on an Internet-based repository or, alternatively, the snapshot may be pushed or pulled to the client and stored on a client-resident repository. In some cases the snapshot may be stored on both an Internet-based repository and a client-resident repository or in part on an Internet-based repository and in part on a client-resident repository. These illustrative alternatives will be presented below in connection with the examples shown in FIGS. 4-7.

Figure 4:
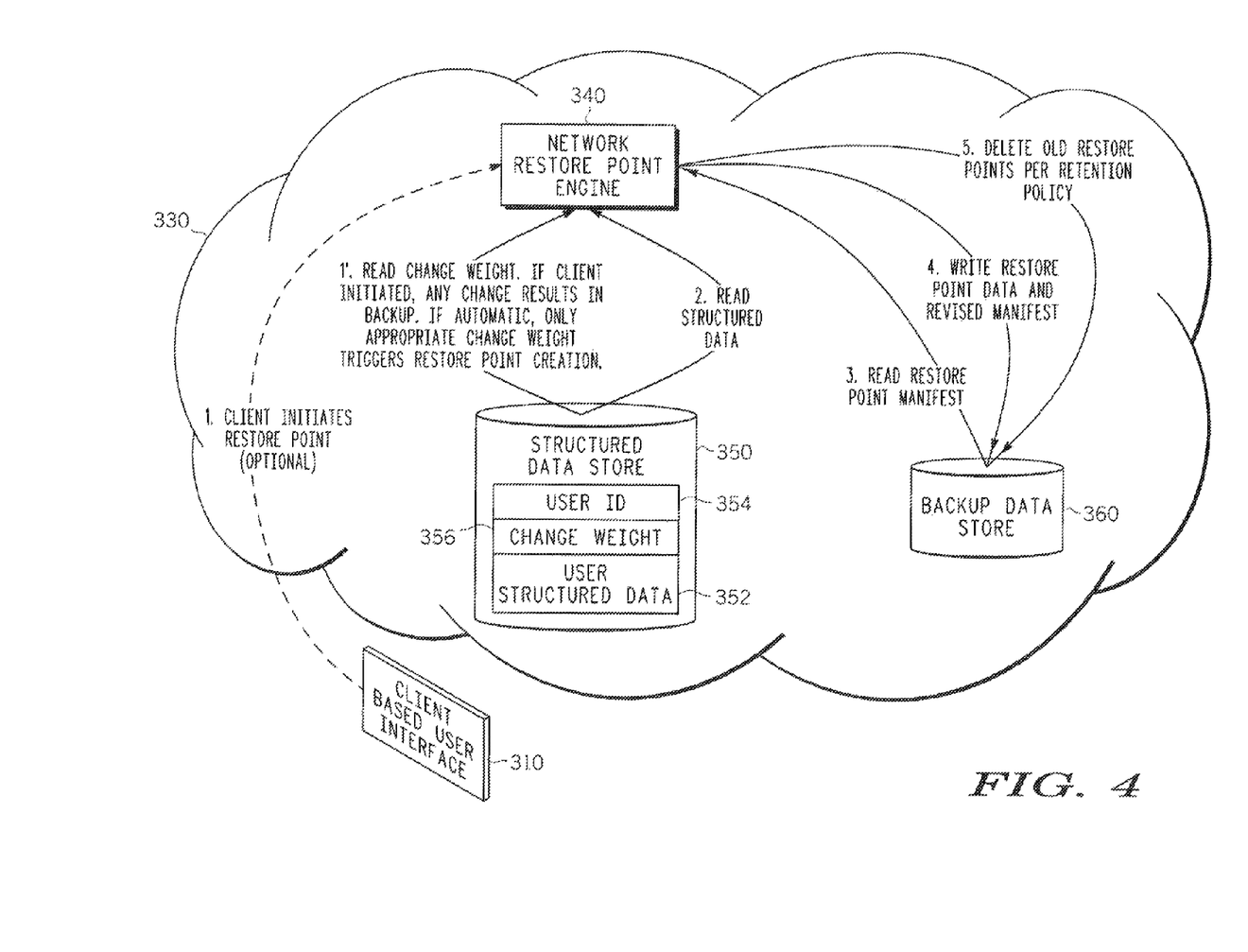
FIG. 4 is a flowchart of an illustrative method for establishing a restore point by storing a snapshot of the structured data on the server side of an Internet cloud.

FIG. 4 is a flowchart of an illustrative method for establishing a restore point by storing the snapshot on the server side of Internet cloud 330. That is, the snapshot that is taken of the structured data set will be stored on a server-based repository, which from the client's perspective may be located within Internet cloud 330.

In FIG. 4, the client is represented by client-based user interface 310, which may be used to initiate the establishment of a restore point, either by establishing a policy by which restore points will be automatically generated or by initiating the creation of a specific restore point. The user interface 310 allows the user to automatically or manually create restore points for the structured data set. The user interface 310 may be part of a stand-alone application or browser or a utility that is accessed by the user when creating the structured data set (e.g., blog, photo album).

In FIG. 4, the structured data set is both stored and backed up by a cloud enabled service (i.e., a service whose functionality is located outside of the client). More specifically, the cloud enabled service is implemented using a network restore point engine 340, a primary storage medium 350 and a backup repository 360 that serves as a secondary storage medium. For simplicity, the snapshot that is taken of the structured data set represents only the underlying data that follows the schema of the structured data set, however, the snapshot may also include the schema as well.

The primary storage medium 350 serves as the main location on which the structured data set resides so that it may be accessed by users when, for instance, continuing with the examples above, they wish to view a photo album, blog or the like. As shown in FIG. 4, the primary storage medium stores the users' structured data 352, as well additional information associated with the structured data 352. Such additional data may include a user ID 354 and a change weight 356, which as described in more detail below, can be assigned to the structured data of each individual user.

The backup repository 360 serves as the location on which the snapshot of the underlying data and possibly the schema itself are stored. The network restore point engine 340 creates the restore points by taking snapshots of the structured data stored in the primary storage medium 350 and storing the snapshots on backup repository 360. Likewise, when needed because certain of the snapshots on the primary storage medium 350 has become lost or corrupted, the network restore point engine 340 accesses the snapshot of a previous restore point that resides on the backup repository 360 and transfers it to the primary storage medium 350.

In general, a snapshot of the user's structured data may be performed whenever the structured data is eligible for backup. For example, the structured data may be eligible for backup when the user initiates a backup, or when a backup is automatically scheduled to be performed at specified intervals or whenever the user's underlying data (and/or the schema) has changed beyond a threshold amount. The changes can be quantified by assigning a weight whenever there is a change in the user's structured data. This weight is added to the sum of all weights that have been assigned to all changes that have occurred to the individual user's structured data since the last backup.

When examining all individual users' structured data stored in the primary storage medium 350, only data belonging to those individuals whose weight exceeds a threshold amount may be backed up (i.e., will be part of the snapshot that is taken). That is, the snapshot may only be acquired and stored when an accumulation of changes in a user's structured data since a previous backup exceeds a prescribed threshold. Once a successful restore point has been created for a user, the aggregate weight assigned to that user's structured data which has been backed up is generally reset to zero.

The premise behind the use of a weight that is assigned to changes in the underlying data (and/or the schema) is that certain changes are typically more significant than other changes. For instance, in the case where the structured data represents a photo album, a user's renaming of a certain chapter in the album can be considered more significant than a user's addition of a new chapter to the album.

Similarly, a user's addition of photo may be considered more significant than the user's deletion of a photo. Likewise, the creation of a new blog entry by a user may be considered more significant than a change in the display order of responses. Weights may be assigned to changes in a myriad of different ways to meet the needs of a particular implementation of the present arrangement.

The cloud enabled service depicted in FIG. 4 can back up user structured data in the following manner. First, as indicated at (1), the network restore point engine 340 initiates a backup process in which a restore point is created either in response to a request received from the client-based user interface 310 or, as indicated at (1'), in response to a pre-established rule that indicates the weight of change in the structured data has exceeded some threshold, which the engine can determine from the change weight 356.

Regardless of how the backup process is initiated, once the network restore point engine 340 is directed at (2) to take a snapshot of a certain user's structured data (e.g., the schema and/or the underlying data associated therewith), the engine 340 reads the structured data from the primary storage medium. At (3), the engine 340 then reads the restore point manifest from the backup repository, which provides descriptive information relating to previous restore points.

For example, in some cases the manifest may be a global manifest that includes a list of users whose structured data has been previously backed up, the dates of the previous backups, and a usage log indicating whether any of the previous backups have been used in a data restoration process. In other cases there may be a separate manifest for each user. Next, at (4), the structured data that has been read by the network restore point engine 340 at (2) is written to the backup repository 360 and the manifest is revised to reflect this latest backup activity. Finally, at (5), previous restore points or snapshots may be deleted in accordance with a retention policy, if such a policy is implemented.

A retention policy may be implemented by the user through the client-based interface 310. Alternatively, a default retention policy can be automatically applied by the network restore point engine 340 itself. In some cases there may be different levels of retention policies that are implemented. For example, a user with a premium restoration service subscription may maintain more restore points and acquire restore points at more frequent intervals than a user with a basic restoration service subscription.

In general the retention policy that is applied will be chosen to cost effectively manage the quantity of backup information that is stored. Examples of retention policies include, without limitation, a policy in which all restore points that are older than 30 days are deleted, a policy in which the last seven restore points are maintained regardless of age, and a policy in which at least one restore point is maintained for each of the last four weeks and each of the last six months.

Figure 5:
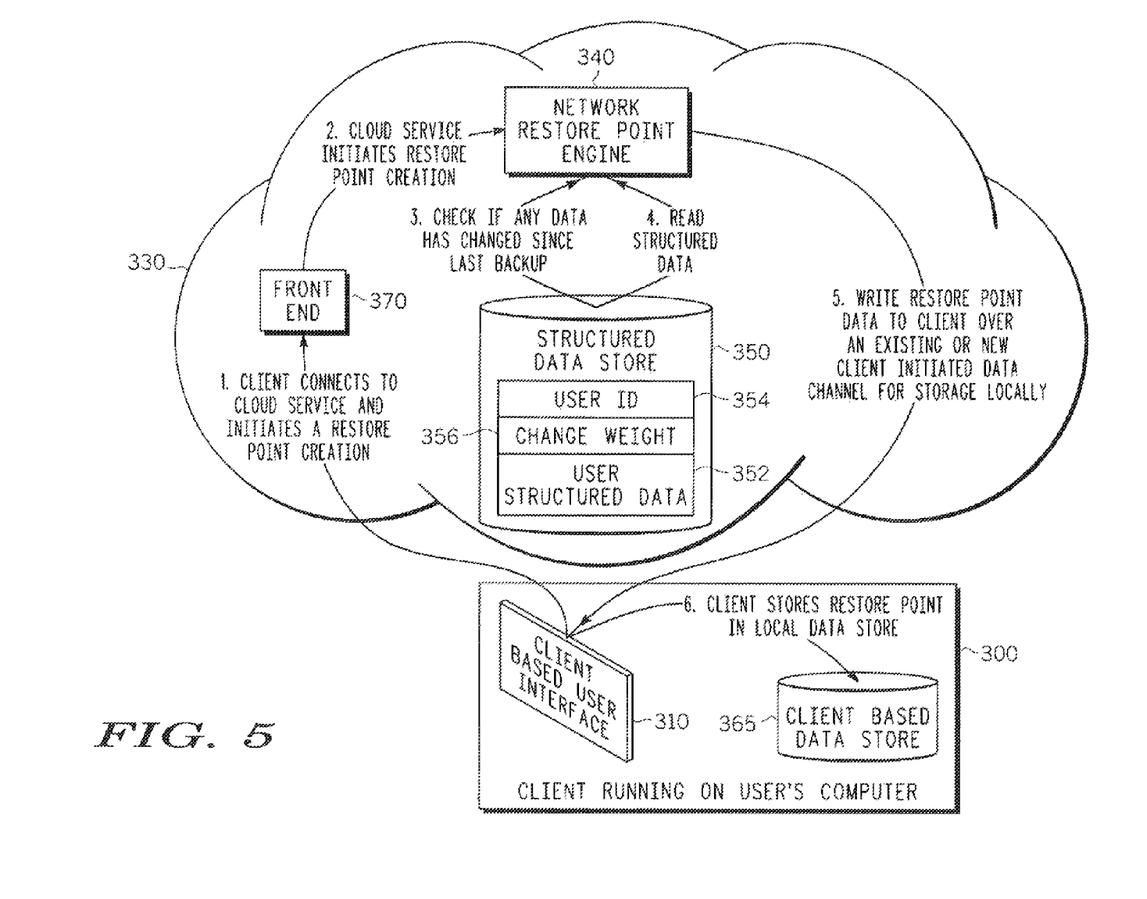
FIG. 5 is a flowchart of an illustrative method for establishing a restore point by storing a snapshot of the structured data on a client-resident storage medium.

FIG. 5 is a flowchart of an illustrative cloud enabled service similar to that shown in FIG. 4 except, in this example the structured data is stored on a client repository. The cloud enabled service depicted in FIG. 5 can back up user structured data in the following manner. First, as indicated at (1), the user interface 310 in client 300 connects to the network restore point engine 340 via a client service front end 370 (while not shown, such a front end may also be provided to access the network restore point engine 340 in FIG. 4).

The front end 370, on behalf of the client 300, initiates the creation of a restore point at (2). In response, the network restore point engine 340 at (3) examines the user's structured data (e.g., the schema and/or the underlying data associated therewith), stored on the primary storage medium 350 to determine if there have been any changes to that user's structured data. If so, then at (4) the engine 340 takes a snapshot of the user's structured data by reading it from the primary storage medium. At (5), the engine 340 then pushes the structured data down to the client 300. At (6), the client 300, in turn, writes the structured data as a restore point to repository 365.

Figure 6:
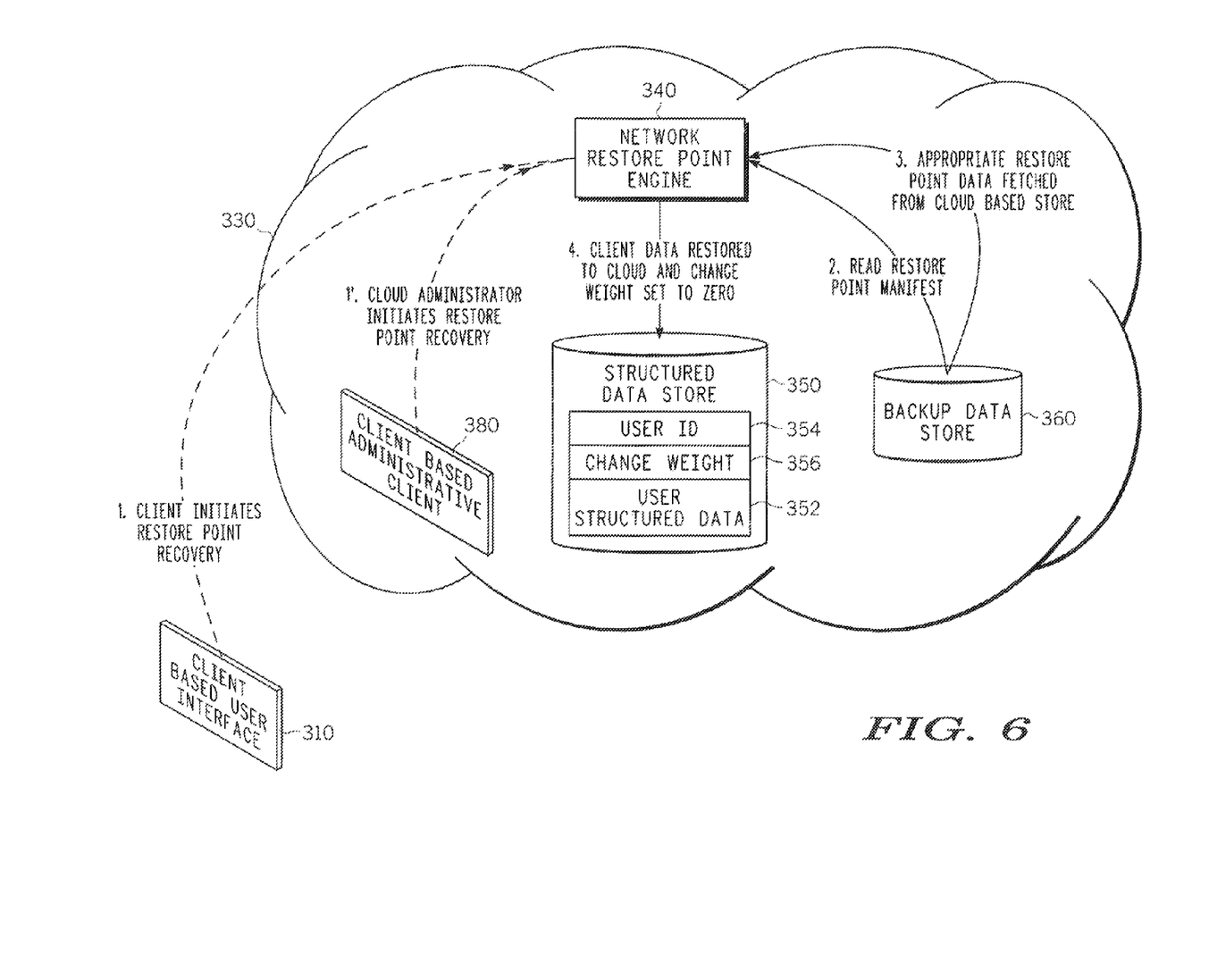
FIG. 6 is a flowchart of an illustrative method for restoring structured data from a previously established restore point that is located on the server side of an Internet cloud.

FIG. 6 is a flowchart of an illustrative method for restoring structured data from a previously established restore point that is located on the server side of Internet cloud 330. The method begins at (1) when the user, via the client-based user interface 310, initiates restoration of his or her structured data by selecting a previous restore point, which will often be the most recently created restore point.

Alternatively, as indicated at (1'), the restoration process may be initiated on behalf of the client by a cloud-based administrative client 380. Cloud-based administrative client 380 will generally operate on behalf of the client as a utility in those cases where the application that is used to create the structured data is a cloud-based application.

The network restore point engine 340 at (2) reads the restore point manifest located on the backup repository 360 to identify and locate the desired restore point and reads the structured data corresponding to that restore point at (3). The structured data that is read from the backup repository 360 is then restored by being written to the primary storage medium 350 at (4). In addition, the change weight data 356 associated with the restored structured data is reset to zero.

Figure 7:
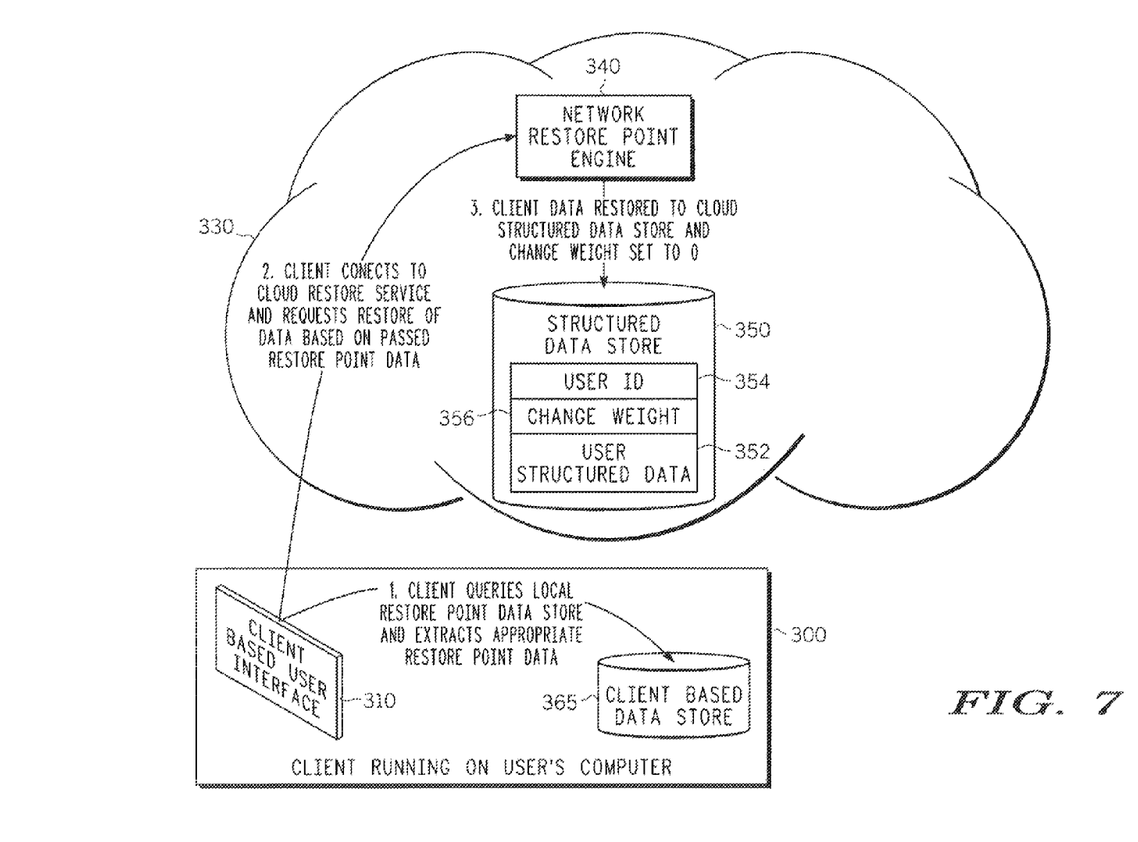
FIG. 7 is a flowchart of an illustrative method for restoring structured data from a previously established restore point that is located on a client-resident storage medium.

FIG. 7 is a flowchart of an illustrative method for restoring structured data from a previously established restore point that is located on the client repository. The method begins at (1) when the user uses the client-based user interface 310 to initiate the restoration process by reading the structured data associated with the desired restore point located on the client-based repository 365.

The client interface at (2) then establishes communication with the network restore point engine 340 and forwards to it the structured data for restoration. The structured data is then restored by being written by the engine 340 to the primary storage medium 350 at (3). In addition, the change weight 356 associated with the restored structured data is reset to zero.

It is emphasized that while the description above and accompanying drawings show a variety of illustrative network restoration architectures, the principles of establishing a snapshot of the schema of structured data should not be viewed as being limited to solely those examples. And, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing a backup for structured data residing on a primary server, the method comprising the steps of:

identifying, from among a plurality of structured data sets including at least one user-defined structured data set, stored on the primary server, at least one structured data set that is eligible for backup, wherein the at least one structured data set is identified as eligible for backup when a backup is scheduled to be performed automatically when underlying data within the at least one structured data set has changed since a previous backup beyond a prescribed threshold, wherein a determination that the underlying data within the at least one structured data set has changed beyond a prescribed threshold is made when a sum of all weights that have been assigned to all changes in the structured data since a last backup exceeds the prescribed threshold;

acquiring from the primary server a snapshot of at least underlying data associated with the identified at least one structured data set; and storing the snapshot associated with the identified at least one structured data set on a secondary storage medium.

2. The method of claim 1 including a further step of providing to a client an Internet-enabled service that acquires and stores the snapshot.

3. The method of claim 1 including a further step of generating the user-defined structured data set using at least in part a client-based application.

4. The method of claim 1 including a further step of generating the user-defined structured data set using at least in part an Internet-based application.

5. The method of claim 1 including a further step of using a utility to acquire and store the snapshot.

6. The method of claim 1 including a further step of rendering the snapshot as an XML representation of the underlying data.

7. The method of claim 1 including a further step of rendering the structured data as a representation of a schema and the underlying data associated with the user-defined structured data set.

8. The method of claim 1 in which the secondary storage medium is accessible to a client generating the user-defined structured data set over an Internet connection.

9. The method of claim 1 including a further step of pushing, or receiving a request to pull, the snapshot over an Internet for storage on a client that stores the user-defined structured data set.

10. The method of claim 1 further comprising maintaining a plurality of previously acquired snapshots that each serve as a restoration point in accordance with a retention policy.

11. A network restoration arrangement for backing up at least underlying data associated with a structured data set, comprising:

an Internet-based primary storage medium configured to store a plurality of structured data sets each associated with a user;

a network restore point engine for automatically establishing restore points of at least underlying data associated with at least one structured data set that is eligible for backup, wherein the at least one structured data set is eligible for backup when a backup is scheduled to be performed automatically when underlying data within the at least one structured data set has changed since a previous backup beyond a prescribed threshold, wherein a determination that the underlying data within the at least one structured data set has changed since a previous backup beyond a prescribed threshold is made when a sum of all weights that have been assigned to all changes in the structured data since a last backup exceeds the prescribed threshold; and a secondary storage medium on which the restore points are stored by the network restore point engine.

12. The network restoration arrangement of claim 11 in which the network restore point engine is further configured to establish a restore point by acquiring a snapshot of a schema and the underlying data associated with the user-defined structured data set.

13. The network restoration arrangement of claim 11 in which the Internet-based primary storage medium is further configured to store change data that reflects an accumulation of changes that have been made to each of the plurality of structured data sets since establishment of a previous restore point.

14. The network restoration arrangement of claim 11 in which the restore points comprise an XML representation of the user-defined structured data set.

15. The network restoration arrangement of claim 11 further comprising a client-accessible front-end server for establishing communication between a client associated with the user and the network restore point engine over the Internet.

16. The network restoration arrangement of claim 15 in which the front-end server is configured to implement a policy for establishing the restore points on behalf of the client.

17. The network restoration arrangement of claim 11 in which the secondary storage medium is located on a client associated with the user.

18. The network restoration arrangement of claim 11 in which the network restore point engine is further configured to restore at least the underlying data associated with the user-defined data set to the primary storage medium using a restore point available from the secondary storage medium.

* * * * *

UNITED STATES PATENT AND TRADEMARK OFFICE
CERTIFICATE OF CORRECTION

| | | |
|---|---|---|
| PATENT NO. | : 8,117,164 B2 | Page 1 of 1 |
| APPLICATION NO. | : 11/959465 | |
| DATED | : February 14, 2012 | |
| INVENTOR(S) | : Spektor et al. | |

It is certified that error appears in the above-identified patent and that said Letters Patent is hereby corrected as shown below:

Title page, Item (74), under "Attorney, Agent, or Firm" column 2, line 1, delete "Meyer" and insert -- Mayer --, therefor.

Signed and Sealed this
Twenty-third Day of October, 2012

David J. Kappos
*Director of the United States Patent and Trademark Office*